United States Patent Office 3,503,128
Patented Mar. 31, 1970

3,503,128
**DENTAL FILLING COMPOSITION OF A COEFFI-
CIENT OF THERMAL EXPANSION APPROXI-
MATING THAT OF NATURAL TOOTH ENAMEL**
Robert N. Boyd, Maplewood, N.J., and Lawrence Colin,
Chappaqua, and Edward G. Kaufman, Lake Success,
N.Y., assignors, by mesne assignments, to Dentsply
International Inc., York, Pa., a corporation of Delaware
No Drawing. Filed Mar. 21, 1966, Ser. No. 535,727
Int. Cl. A61k 5/02; C08g 51/04
U.S. Cl. 32—15                                      4 Claims

ABSTRACT OF THE DISCLOSURE

A process of filling a cavity within a tooth with a filled-resin dental filling material or composition comprising:

(a) from about 5% to about 50% by weight of a synthetic resin capable of being cured at a low temperature; and
(b) a finely divided filler comprising
  (1) 50 to 80% by weight, based on the weight of the total composition, of one or more materials having a negative coefficient of thermal expansion; and
  (2) 0 to 25% by weight, based on the weight of the total composition, of one or more materials having a low coefficient of thermal expansion.

The composition is such that the combined coefficient of thermal expansion of the filler and resin closely approximates that of the tooth enamel over the entire temperature range existing within the oral environment. Optionally, a silane bonding agent is employed to enhance adhesion between the filler and resin.

---

The present invention is directed to a mineral reinforced resin composition and more particularly to such composition useful as a direct filling composition for dental purposes.

The most commonly employed direct filling materials available to dentists that are capable of matching the teeth in appearance are the silicate cements and the methacrylate-based resins. These silicate cements and methacrylate resins, however, give limited service as dental filling materials for anterior teeth because of their low strength, excessive solubility in mouth fluids, and their incompatibility with the tooth structure with respect to the coefficients of linear thermal expansion. In addition, the methacrylate-based direct filling materials have a relatively high shrinkage upon hardening, and low stiffness and low tensile strength.

The following table is presented to further illustrate various characteristics of these direct filling materials in comparison with natural tooth structure:

Previous attempts to achieve such a composition have not been successful. Thus, for example, the employment of fused porcelain, although esthetic, has not proved satisfactory since such material is too brittle for advantageous use. Furthermore, previous attempts to improve the properties of direct filling materials by the incorporation of various fillers, e.g., silicates in resins, e.g., methacrylate-based resins, while improving certain of the deficiencies of previously employed materials, have not been able to eliminate the problem of solubility, nor have they been able to eliminate the inherent deficiency of previously employed direct filling materials with respect to incompatibility of the linear coefficients of expansion of the filling material and tooth.

It has now been found, however, that by the employment of the composition of the present invention wherein a filler selected from minerals having a negative coefficient of thermal expansion, materials having a very low coefficient of thermal expansion, and mixtures of these is employed with a conventional low temperature curing liquid resin, a composition having a relatively short setting and curing time, great physical strength and a coefficient of thermal expansion similar to that of natural tooth structure, can be realized.

It is therefore a principal object of the present invention to provide a direct dental filling composition which is relatively free from the inherent deficiencies of previously employed materials.

It is a further object of the present invention to produce a low temperature curing direct dental filling composition having unusual strength and a very low coefficient of thermal expansion closely approaching that of a natural tooth.

It is yet a further object of the present invention to provide a resinous direct dental filling material comprising a low curing liquid resin and a filler selected from minerals having a negative coefficient of linear expansion, materials having a very low coefficient of linear expansion, and mixtures of these.

It is still a further object of the present invention to provide such a resinous direct dental filling material wherein the filler and resin are bonded by appropriate silanes and such composition additionally contains polymerization catalysts and accelerators.

Still further objects and advantages of the composition of the present invention will become more apparent from the following more detailed description of the invention.

The hard, dense dental filling composition of the present invention comprises from about 5% to about 65% by weight of a low temperature curing resin, the remainder of said composition comprising a filler composition, a silane bonding agent, and appropriate polymerization catalysts and accelerators of promoters.

The resin employed in the composition of the present invention essentially can be any resin material appropri-

TABLE 1

| Material | Tensile strength, p.s.i. | Compressive strength, p.s.i. | Indentation Rockwell 30-y(in.) | Coefficient of expansion ×10⁶ | Modulus of Elasticity ×10⁻⁶ |
|---|---|---|---|---|---|
| (1) Methyl methacrylate | 4,000–6,000 | 10,700 | .0038–.0045 | 80–100 | 0.26 |
| (2) Silicate cement | 700 | 23,000–27,000 | .0016 | 7.8 | 2.1 |
| (3) Enamel | 1,500 | 14,000–56,000 | .0013 | 11.4 | 6.9–12.0 |
| (4) Dentin | 7,800 | 50,000 | .0018 | 7.8 | 2.8 |

For the reasons set forth above, and as illustrated by the above table, it has long been the desire of the dental profession to prepare a direct filling composition which possesses high mechanical strength and physical properties which closely conform to natural tooth structure and therefore make it more suitable as a filling material.

ate for dental use which is capable of producing a hard cured product at low temperature, i.e., room temperatures. A relatively short setting or curing time at such room temperatures is essential in order to allow the resin composition to cure to a hard, dense product under conditions existing in the oral cavity when the mouth is held open.

In general, the base resin is preferably selected from various polyester and epoxy resins. Suitable non-limitative materials, for example, are the propylene glycol fumarate phthalate unsaturated polyesters such as sold by the Allied Chemical Co. under the name LS 5275 and by Pittsburgh Plate Glass (P.P.G.) under the name Selectron 580001; styrene modified unsaturated polyesters such as Glidden Glidpol 1008, G–136 and 4CS50; and epoxy resins, such as sold under the name Ciba Araldite 6020. Also, a newly prepared material, a polymer of Bisphenol A and glycidyl methacrylate, as shown in U.S. Patent 3,194,783 can be advantageously employed in the direct filling composition of the present invention. It is again noted that the above materials are merely exemplary of the broad groups that can be advantageously employed in the composition of the present invention.

The remainder of the direct dental filling composition of the present invention comprises a filler material, a silane bonding agent, and appropriate polymerization catalysts and promoters or accelerators.

The filler of the dental composition of the present invention comprises either one or more materials having a negative coefficient of thermal expansion, one or more materials having a low coefficient thermal expansion, or mixtures of certain of such materials.

Suitable filler materials having a negative coefficient of thermal expansion include minerals selected from lepoidolite, petalite, beta eucryptite ($Li_2O \cdot Al_2O_3 \cdot 2SiO_2$) and spodumene. Of these, beta eucryptite is preferred.

Those materials having a low coefficient of thermal expansion that are advantageously employed in the direct dental filling composition of the present invention include, for example, topaz, white beryl, silicon carbide whiskers and/or fibers, alpha alumina whiskers and/or fibers and zirconium silicate, etc.

Materials from the above two groups can be employed alone, or in combinations of two or more from the same group, or as a combination of materials employing materials having both a negative coefficient of thermal expansion and those having a low coefficient of thermal expansion.

For the present invention, materials having a low coefficient of thermal expansion are meant to include those having a coefficient below about $15.0 \times 10^{-6}/°C$. Thus, for example, the coefficient reported for topaz is $4.7 \times 10^{-6}/°C$, white beryl $-1.35 \times 10^{-6}/°C$, alumina $8.7 \times 10^{-6}/°C$, and zirconium silicate $4.2 \times 10^{-6}/°C$. Of these materials, topaz is preferred. In addition to having a very low coefficient of linear thermal expansion, topaz is highly desirable in that it contains a useful amount of fluoride a caries deterrent, and possesses about 30% hydroxy radicals which are extremely advantageous in silane bonding.

Of the above materials having a low coefficient of thermal expansion, in accordance with this invention, the fibers or whiskers of alumina and silica carbide are employed primarily as reinforcing agents in the filled resin dental filling composition. This does not mean, however, that their low coefficient of thermal expansion cannot be conveniently employed in producing the desirable properties of the present composition with respect to the coefficient of expansion.

The minerals having a negative coefficient of thermal expansion when incorporated in the base resin compensate for the coefficient of the base resin such that the reinforced polymerized resin has a very low coefficient of expansion which approaches the coefficient of expansion of the natural tooth structure.

Although either the minerals having a negative coefficient of linear thermal expansion or the materials having a low coefficient can be used separately in accordance with the present invention, it may be advantageous to employ materials from both of these groups in the filler composition. In this manner, the coefficient of linear thermal expansion of the filled resin system can be more closely regulated so as to provide a direct dental filling material having a coefficient closely approaching that of the tooth structure.

As a preferred embodiment of the present invention, it has been found advantageous to employ, as a major amount of filled resin composition, those minerals having a negative coefficient of linear thermal expansion. Such a material is usually employed in an amount of from 50–88% by weight of the total composition or an even greater percentage can be employed. The remainder of the filler, if any, consists of a minor amount of materials having a low coefficient of thermal expansion along with the silane bonding agent.

Although not an essential constituent, the silane bonding agent when employed, is usually employed in an amount sufficient to assure adequate bonding of the filler material or materials to the base resin. Usually an amount necessary to produce a layer of silane from about one to about sixteen monolayers thick on the surface of the filler is advantageously utilized in the dental filling composition of the present invention. In general, such an amount is approximately up to 10.0% by weight of the total composition. In addition to bonding the filler to the resin base, the silane bonding agent is also useful in bonding the filled resin dental filling composition to the natural tooth. In this manner, these materials serve a dual function.

In general, any silane bonding agent that is advantageously employed in dental compositions can be effectively employed in the direct filling material of the present invention. Non-limitative representative materials include, for example: methacryloxy propyl trimethoxysilane, (N,N) bis-beta-hydroxyethyl-gamma-amino propyltriethoxy silane, 3,4-epoxycyclohexyl-ethyl-trimethoxy silane, glycidyloxy-propyl-trimethoxy silane, vinyl trichlorosilane, tris (2-methoxy ethoxy) vinyl silane, trimethoxy silyl propyl methacrylate, dimethyl vinyl chlorosilane and various other materials.

Where the base resin is an epoxy resin, those silanes containing an epoxy radical are preferred since greater adhesion is realized from the combined effect of these materials.

The silane bonding agent is generally added to the filler material, or materials, after such reinforcing fillers are heat cleaned at a high temperature and/or high vacuum in order to remove all absorbed impurities. Alternatively, however, it is possible to add about half of the silane to such filler, the remainder being added to the low temperature curing liquid resin. In either case, the silane performs both the functions of bonding filler to resin and assisting the bonding of the filled resin to the natural tooth cavity.

The composition of the present invention can thus be summarized as follows:

| Constituent: | Weight percent |
|---|---|
| Resin | 5–65 |
| Silane bonding agent | 0–10 |
| Filler | Remainder |

The preferred embodiment of the present invention can similarly be summarized as follows:

| Constituent: | Weight percent |
|---|---|
| Resin | 10–40 |
| Silane bonding agent | 0.05–8 |
| Filler (1)—negative coefficient | 50–88 |
| Filler (2)—low coefficient | 0–25 |

In all of the above formulations, a minor amount of a polymerization catalyst and a polymerization promoter or accelerator, is normally employed. The catalyst materials can be any of the conventionally employed peroxide catalysts, e.g., aliphatic ketone peroxides, benzoyl peroxide, etc., or other similarly employed catalysts for dental resin polymerization.

Such catalysts are conventionally added to the compositions presented above in an amount ranging from about 0.001 to about 5.0% by weight of the total composition. Similarly conventional promoters or accelerators, e.g. metal acetyl acetonates, cobalt octoate, tertiary amines, etc., are added in an amount corresponding to about 0.01% to about 3% based on the total dental composition.

The composition of the present invention will be further illustrated with reference to the following non-limitative examples:

EXAMPLE I

The following composition was prepared:

| Constituent: | Percent by weight |
|---|---|
| P.P.G. Selectron 58001 (a propylene glycol fumarate phthalate unsaturated polyester) | 23.43 |
| Methyl ethyl ketone peroxide | 0.23 |
| Dimethyl aniline in styrene | 0.09 |
| 12% cobalt octoate solution in inert vehicle | 0.05 |
| Methacryloxy propyl trimethoxysilane | 2.12 |
| Beta-eucryptite (powdered) | 65.65 |
| Topaz (powdered) | 8.43 |

The above composition was found to produce a reinforced resin with a coefficient of thermal expansion of $19.1-27.9 \times 10^{-6}/°$ C. over the range of 0° C. to 60° C.; a setting time of 7 minutes; tensile strength of 1600 p.s.i.; and a compression strength of 8500 p.s.i.

EXAMPLE II

The following composition was prepared:

| Constituent: | Percent by weight |
|---|---|
| Allied Chemical LS 5275 (a propylene glycol fumarate phthalate unsaturated polyester) | 17.45 |
| 12 cobalt octoate solution in inert vehicle | 0.02 |
| Aliphatic ketone peroxide | 0.38 |
| Methacryloxy propyl trimethoxy silane | 2.15 |
| Beta-eucryptite | 80.00 |

As with the material of Example I, this reinforced resin material compared favorably to natural tooth structure with respect to coefficient of thermal expansion and tensile strength.

EXAMPLE III

The following composition was prepared:

| Constituent: | Percent by weight |
|---|---|
| Allied Chemical LS 5275 polyester | 18.43 |
| Quaternary Ammonium chloride promoter | 0.10 |
| Aluminum acetyl acetonate | 0.10 |
| Dodecyl mercaptan | 0.19 |
| Aliphatic ketone peroxide | 0.38 |
| Glycidoxy-propyl-trimethoxy silane | 0.80 |
| Beta-eucryptite | 80.00 |

Here again, as in Examples I and II, a reinforced resin which compared favorably with natural tooth material was produced. Also, when the aluminum acetyl acetonate accelerator was replaced with cobalt, vanadium, ferrous vanadyl and magnesium acetyl acetonate, similar advantageous compositions were produced.

EXAMPLE IV

The following composition was prepared:

| Constituent: | Percent by weight |
|---|---|
| P.P.G. Selectron 58001 (polyester resin) | 19.31 |
| Methyl ethyl ketone peroxide | 0.20 |
| 12% cobalt octoate solution | 0.04 |
| Dimethyl aniline in styrene | 0.08 |
| Beta eucryptite | 78.90 |
| 3,4 epoxycyclohexyl-ethyl-trimethoxy silane (2 monolayers) | 0.47 |
| Alpha alumina whiskers | 1.00 |

The above composition produced a reinforced resin with a coefficient of linear expansion of $22-23.9 \times 10^{-6}/°$ C. over a range of 0° C.–60° C., a setting time of 7 minutes, and a tensile strength of 2500–2900 p.s.i.

EXAMPLE V

The following composition was prepared:

| Constituent: | Percent by weight |
|---|---|
| Glidden Glidpol G–136 (styrene modified polyester resin) | 29.16 |
| Benzoyl peroxide | 0.71 |
| Styrene | 0.57 |
| $ZrSiO_4$ | 68.02 |
| Methacryloxy propyl trimethoxysilane | 1.54 |

The above composition produced a resin with a coefficient of thermal expansion of $39 \times 10^{-6}/°$ C., a setting time of 10 minutes, a tensile strength of 5400–7100 p.s.i., compression strength of 12000, and a hardness of .0025 (Rockwell 30–Y).

EXAMPLE VI

The following composition was prepared:

| Constituent: | Percent by weight |
|---|---|
| Glidden Glidpol G–136 (above) | 27.09 |
| Benzoyl peroxide | 0.68 |
| Styrene | 1.35 |
| Methacryloxy propyl trimethoxy silane | 1.50 |
| $ZrSiO_4$ | [1] 67.88 |

[1] Added to resin with 1.50% of above silane, or powder hydrolyzed by $H_2O$.

In the preparation of this composition, the zirconium silicate was treated with 1 monolayer of silane calculated according to the area of the powder in relation to the area coverage of the silane (approximately 3.0%). The coated powder was hydrolyzed in acetic acid and deionized water in an ultrasonic vibrator and dried at 230° F.

The above composition produced a reinforced resin with a coefficient of thermal expansion of $39 \times 10^{-6}/°$ C., a setting time of 10 minutes, tensile strength of 5400–6450 p.s.i., a compression strength of 12,000 p.s.i., and a Rockwell hardness of .0025.

EXAMPLE VII

The following composition was prepared:

| Constituent: | Percent by weight |
|---|---|
| Ciba Araldite 6020 (100% epoxy resin based on bis-phenol A) | 40.0 |
| Boron trifluoride hardener in dibutyl phthalate | 20.0 |
| Petalite | 36.49 |
| $Al_2O_3$ whiskers | 3.50 |
| Glycidoxy-propyl-trimethoxy silane | 0.01 |

EXAMPLE VIII

The following compositions having properties similar to that of natural tooth materials was prepared:

| Constituent: | Percent by weight |
|---|---|
| PPG Selectron 58001 (polyester resin) | 10.0 |
| Methyl ethyl ketone peroxide | 1.0 |
| Dimethyl aniline in styrene | 0.40 |
| Cobalt octoate | 0.30 |
| $Al_2O_3$ | 7.15 |
| Methacryloxy propyl trimethoxy silane | 2.25 |
| Beta-eucryptite | 71.8 |
| Topaz | 8.1 |

EXAMPLE IX

The following composition was prepared:

| Constituent: | Percent by weight |
|---|---|
| Dow Derakane [1] | 55.00 |

Vinyl-ester compound:

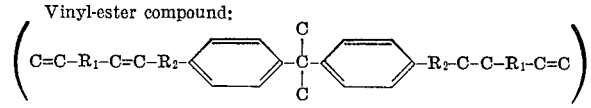

| | |
|---|---|
| Beta-eucryptite | 43.00 |
| Benzoyl peroxide | 2.06 |

[1] The Dow Derakane resins are thermosetting resins having molecular weights of less than 1,000 and based on bisphenol A. See column 1, Chemical Week, Feb. 26, 1966, page 33.

EXAMPLE X

The following composition was prepared:

| | Percent by weight |
|---|---|
| Dow Derakane | 12.00 |
| Beta-eucryptite | 85.00 |
| Glycidyl propyl-trimethoxy silane | 1.00 |
| Benzoyl peroxide | 2.00 |

In most of the above examples the fillers were treated with the silane separately and then mixed and added to the resin prior to the addition of accelerators, promoters, catalysts, or hardeners. The amount of silane in each case was calculated, based on the area of 100 grams of filler and the area of coverage of 1 gram of silane.

As is noted from the above examples, the formulations of the present invention had properties of hardness and strength and a coefficient of thermal expansion similar to that of tooth enamel and in addition, hardened in less than 11 minutes. These properties, therefore, make such compositions extremely useful as direct filling materials.

While certain preferred embodiments of the present invention have been shown by way of specific example, it is to be understood that the invention is in no way to be limited thereto, but should be construed as broadly as all or any equivalents thereof.

Having adequately described the invention, what is claimed is:

1. In a process of filling a cavity within a tooth with a filled-resin dental filling composition having a relatively short setting time, the improvement which comprises providing a dental filling having a coefficient of thermal expansion closely approximating that of natural tooth enamel by using a dental filling composition consisting essentially of:
    (a) from about 5% to about 50% by weight of a liquid synthetic resin capable of being cured at low temperatures and selected from unsaturated polyesters and epoxy resins; and
    (b) a finely divided filler comprising:
        (1) 50% to 88% by weight, based on the weight of the total composition, of one or more materials having a negative coefficient of thermal expansion selected from beta-eucryptite, lapidolite, petalite and spodumene; and
        (2) 0 to 25% by weight, based on the weight of the total composition, of one or more materials having a low coefficient of thermal expansion selected from topaz, white beryl, silicon carbide whiskers, silicon carbide fibers, alpha alumina whiskers, alph alumina fibers and zirconium silicate.

2. The process of claim 1, wherein the finely divided filler is one which has been pre-treated with a silane bonding agent in an amount of 0.05–8% by weight, based on the weight of the total composition.

3. The process of claim 2, wherein a portion of the silane bonding agent is incorporated in the synthetic resin.

4. The process of claim 1, wherein the filler having a negative coefficient of thermal expansion is beta-eucryptite.

References Cited

UNITED STATES PATENTS

| | | | |
|---|---|---|---|
| 3,194,784 | 7/1965 | Bowen | 32—15 |
| 2,035,180 | 3/1936 | Brill | 106—35 |
| 831,185 | 9/1906 | Rawitzer | 106—35 |

OTHER REFERENCES

C. A. Harper: "Electronic Packaging With Resins," McGraw-Hill Book Co., New York, 1960, pp. 129, 130, 131, 132, 133.

Hummel: Thermal Expansion Properties of Some Synthetic Lithia Minerals; "Journal of The American Ceramic Society," 1951; vol. 34, pp. 235–239.

MORRIS LIEBMAN, Primary Examiner

L. T. JACOBS, Assistant Examiner

U.S. Cl. X.R.

106—35; 260—37, 40